United States Patent [19]

Kinoshita et al.

[11] 4,248,8[...]

[45] Feb. 3, 19[...]

[54] PROCESS FOR PREPARING CRYSTALLINE PHOSPHONITRILIC CHLORIDE OLIGOMERS

[75] Inventors: Tsukuru Kinoshita; Yuzuru Ogata; Masayoshi Suzue, all of Tokushima, Japan

[73] Assignee: Otsuka Chemical Co., Ltd., Osaka, Japan

[21] Appl. No.: 964,462

[22] Filed: Nov. 29, 1978

[30] Foreign Application Priority Data

May 9, 1978 [JP] Japan .................................. 53-55237

[51] Int. Cl.$^3$ ............................................. C01B 25/10
[52] U.S. Cl. ..................................................... 423/300
[58] Field of Search ......................................... 423/300

[56] References Cited

U.S. PATENT DOCUMENTS

| | | | |
|---|---|---|---|
| 3,359,080 | 12/1967 | Ridgway et al. | 423/300 |
| 3,669,633 | 6/1972 | Beinfest et al. | 423/300 |
| 3,860,693 | 1/1975 | Graham | 423/300 |
| 4,139,598 | 2/1979 | Reynard et al. | 423/300 |

FOREIGN PATENT DOCUMENTS

| | | | |
|---|---|---|---|
| 748909 | 10/1970 | Belgium | 423/300 |
| 50-33033 | 10/1975 | Japan | 423/300 |
| 207883 | 12/1967 | U.S.S.R. | 423/300 |
| 242860 | 5/1969 | U.S.S.R. | 423/[...] |

*Primary Examiner*—O. R. Vertiz
*Assistant Examiner*—Wayne A. Langel
*Attorney, Agent, or Firm*—Armstrong, Nikaido, Marmelstein & Kubovcik

[57] ABSTRACT

A process for preparing tri- and tetra-phosphonitri[...] chlorides in a shortened period of time in high yields [...] reacting ammonium chloride with phosphorus pen[...] chloride in an organic solvent inert to chlorine in t[...] presence of at least one catalyst selected from me[...] oxides of Groups II-A, II-B, III-A, IV-A, IV-B a[...] VIII of the Periodic Table, metal sulfides, metal salts [...] fatty acids, metal complexes, organometallic co[...] pounds and metal peroxides of Groups II-A and II-B [...] the Periodic Table, metal hydroxides of Groups III [...] and VIII of the Periodic Table, and magnesium hydr[...] ide. Phosphorus pentachloride may also be produc[...] simultaneously with the reaction by reacting phosph[...] rus trichloride employed instead of phosphorus pen[...] chloride with chlorine gas supplied into the reacti[...] system, or by previously reacting phosphorus employ[...] instead of phosphorus pentachloride with chlorine g[...] supplied into the reaction system to produce phosph[...] rus trichloride and then reacting phosphorus trichlori[...] with chlorine gas in the same manner as in the ca[...] using phosphorus trichloride as the starting material.

7 Claims, No Drawings

PROCESS FOR PREPARING CRYSTALLINE PHOSPHONITRILIC CHLORIDE OLIGOMERS

BACKGROUND OF THE INVENTION

The present invention relates to a process for preparing phosphonitrilic chloride oligomers, and more particularly to an improved process for preparing tri- and tetra-phosphonitrilic chlorides in high yields.

It is well known that crystalline phosphonitrilic chloride oligomers, namely tri- and tetra-phosphonitrilic chlorides are the starting materials for preparing polyphosphonitrilic chloride generally called inorganic rubber. The use of poly-phosphonitrilic chloride derivatives of various kinds is very wide and they are employed availably as plastics, rubbers, plasticizers and fertilizers. Particularly, poly-phosphonitrilic chloride derivatives in use as plastics are watched in point of the flame-resistance or nonflammability, since combustion of plastics becomes a social problem.

The phosphonitrilic chloride oligomers were found first in the year 1834 by Liebig as by-products in the reaction of ammonium chloride and phosphorus pentachloride which was conducted for the purpose of synthesizing phosphonitrilic amide $NP(NH_2)_2$. After that, many researches as to the phosphonitrilic chloride oligomers have been made, and typical methods for synthesizing the oligomers hitherto known are as follows:

[A] Methods using phosphorus pentachloride
(a) $PCl_5 + NH_4Cl$
(b) $PCl_5 + NH_3$
(c) $PCl_5 + NH_3 + HCl$

[B] Methods using phosphorus trichloride
(d) $PCl_3 + Cl_2 + NH_4Cl$
(e) $PCl_3 + Cl_2 + NH_3$

[C] Method using white phosphorus
(f) $P + Cl_2 + NH_3$

[D] Methods using phosphorus nitride
(g) $P_3N_3 + Cl_2$
(h) $P_4N_5 + Cl_2$

Among these typical synthetic methods [A] to [D], the methods [D]-(g) and [D]-(h) are not suited for the synthesis on an industrial scale, because of being in danger of explosion.

Method on which the most researches have been made up to now is the method [A]-(a) using phosphorus pentachloride and ammonium chloride. The method [A]-(a) is classified into two large methods. One of them is a method is which phosphorus pentachloride and 1.0 to 2.0 moles of ammonium chloride per mole of phosphorus pentachloride are first added to a reaction vessel, and then reacted in an organic solvent for 15 to 30 hours at a boiling point of the solvent under reflux. The yield of the phosphonitrilic chloride oligomers is low and at most 30% to 40% by weight. Another is a method in which the reaction is carried out by adding dropwise a solution of phosphorus pentachloride in an organic solvent to a dispersion of ammonium chloride in the same organic solvent. This method is the improvement of the former to reduce the production of higher cyclic phosphonitrilic chlorides $(NPCl_2)_{5-11}$ and liner compounds $(NPCl_2)_n \cdot PCl_5$, which are inevitably by-produced at the time of preparing the phosphonitrilic chloride oligomers, particularly tri- and tetra-phosphonitrilic chlorides necessary for preparing polyphosphonitrilic chloride. The yield of the oligomers is raised to 50% to 60% by weight. However, it is necessary to previously dissolve phosphorus pentachloride an organic solvent at a temperature of 80° to 90° C., ar moreover it is necessary to maintain a pathway fo adding dropwise the solution of phosphorus pentachlo ride at the above temperature. Therefore, this method not also necessarily suitable for the industrial preparation.

The method [A]-(b) has the disadvantages that addition to choking of a tube for introducing $NH_3$ g and difficulty of controlling the amount of flowin $NH_3$ gas, the yield of the oligomers is only about 20% about 30% by weight.

The method [A]-(c) is conducted by first supplyin ammonia gas and hydrogen chloride gas into an organ solvent to produce ammonium chloride, and then ad ing phosphorus pentachloride into the solvent to rea them so as to produce the oligomers. The object of th method is to make ammonium chloride particles small as possible in order to raise the yield of the olig mers and to shorten the reaction time. For this purpos the temperature for producing ammonium chloride advance of the reaction of ammonium chloride an phosphorus pentachloride is desirable to be lower tha 30° C. to prevent the increase of the particle size of th produced ammonium chloride particles. Since the rea tion of producing ammonium chloride is an exotherm reaction, a cooling apparatus is required. Therefor there are required thermal procedures of two stag which are contrary to each other, at the first stage which ammonia and hydrogen chloride are reacted t produce ammonium chloride with cooling and at th second stage of which the resulting ammonium chlorid and phosphorus pentachloride are reacted with heatin This is industrially disadvantageous.

The method [B]-(d) which has been studied is method where phosphorus trichloride is added to reaction medium at once before starting the reaction. I such a method, it is difficult to smoothly start the rea tion at a temperature of more than 100° C., since th boiling point of phosphorus trichloride is low, i.e. abou 75° C.

The methods [B]-(e) and [C]-(f) have the disadvar tage of choking of a tube for introducing $NH_3$ gas.

It is also known to employ an anhydrous metal chlc ride such as aluminum chloride, zinc chloride, magne sium chloride or titanium chloride as a catalyst in orde to shorten the reaction time. However, these met; chloride catalysts are deliquescent or easy to hydrolyz and, therefore, are unhandy. Moreover, they have little effect of raising the yields of the phosphonitrili chloride oligomers and only have the effect of shorter ing the reaction time.

OBJECTS OF THE INVENTION

It is an object of the present invention to provide process for preparing phosphonitrilic chloride olig mers.

A further object of the invention is to provide a pr cess for preparing crystalline phosphonitrilic chlorid oligomers in high yields.

A still further object of the invention is to provide process for preparing phosphonitrilic chloride olig mers in a shortened period of time.

Another object of the invention is to provide a pr cess for preparing crystalline phosphonitrilic chlorid oligomers, i.e. tri- and tetra-phosphonitrilic chlorides i high yields in a shortened period of time.

These and other objects of the invention will become apparent from the description hereinafter.

DETAILED DESCRIPTION

It has now been found that the above-mentioned objects can be attained by carrying out a reaction of ammonium chloride with phosphorus pentachloride at a temperature of 100° to 200° C. in an organic solvent inert to chlorine in the presence of 0.01% to 10% by weight, based on the weight of phosphorus pentachloride, of at least one catalyst selected from the group consisting of metal oxides of Groups II-A, II-B, III-A, V-A, IV-B and VIII of the Periodic Table, metal sulfides, metal salts of fatty acids, metal complexes, organometallic compounds and metal peroxides of Groups II-A and II-B of the Periodic Table, metal hydroxides of Groups III-A and VIII of the Periodic Table, and magnesium hydroxide. According to the present invention, the amount of the by-produced higher cyclic and linear phosphonitrilic chloride oligomers can be remarkably reduced, and tri- and tetra-phosphonitrilic chlorides can be produced in high yields in a shortened period of time.

In the present invention, phosphorus trichloride and phosphorus such as white phosphorus or yellow phosphorus may be employed instead of phosphorus pentachloride. In case of employing phosphorus trichloride as the starting material, while phosphorus trichloride is reacted with chlorine to produce phosphorus pentachloride by supplying chlorine gas into a reaction system, the resulting phosphorus pentachloride is reacted with ammonium chloride. Since phosphorus trichloride is liquid, the use of phosphorus trichloride has the advantages that the handling is easy and the amount of phosphorus trichloride against the amount of the organic solvent is increased to raise the productivity. In case of employing phosphorus as the starting material, phosphorus is previously reacted with chlorine at a temperature of 70° to 90° C. to produce phosphorus trichloride by supplying chlorine gas into a reaction system, and then the same procedure as in the case using phosphorus trichloride as the starting material is conducted.

Examples of the catalyst employed in the present invention are metal oxides of Groups II-A, II-B, III-A, V-A, IV-B and VIII of the Periodic Table such as MgO, CaO, ZnO, $B_2O_3$, SnO, $TiO_2$ and CoO, metal sulfides of Groups II-A and II-B such as BaS, CaS and ZnS, metal salts of saturated and unsaturated fatty acids having 2 to 18 carbon atoms of Groups II-A and II-B of the Periodic Table such as $Ba(CH_3COO)_2$, $Mg(C_{18}H_{35}O_2)_2$ and $Zn(C_{18}H_{35}O_2)_2$, metal complexes of Groups II-A and II-B of the Periodic Table such as acetylacetonatomagnesium $[Mg(C_5H_7O_2)_2]$ and acetylacetonatozinc $[Zn(C_5H_7O_2)_2]$, organometallic compounds of Groups II-A and II-B of the Periodic Table such as $(C_2H_5)_2Zn$ and $(C_2H_5)_2Mg$, metal peroxides of Groups II-A and II-B of the Periodic Table such as $ZnO_2$, $CdO_2$ and $MgO_2$, metal hydroxides of Groups II-A and VIII of the Periodic Table such as $Al(OH)_3$ and $Co(OH)_2$, and $Mg(OH)_2$. The metal oxides such as MgO and ZnO and metal sulfides such as BaS and ZnS are preferred from a viewpoint of industrial preparation.

The catalyst is employed in an amount of 0.01% to 10% by weight based on the weight of phosphorus pentachloride employed. In case of employing phosphorus trichloride or phosphorus as the starting material, its weight is calculated as phosphorus pentachloride. When the amount of the catalyst is less than 0.01% by weight, remarkable effects are hard to obtain, and when the amount of the catalyst is more than 10% by weight, the production of undesirable linear oligomers increases.

In the present invention, the reaction is carried out in an organic solvent inert to chlorine. Examples of the organic solvent employed in the present invention are tetrachloroethylene, tetrachloroethane, chlorobenzene, dichlorobenzene, xylene and nitrobenzene. Chlorobenzene is preferably employed.

The organic solvent is employed in a ratio of 0.1 to 10 ml., preferably 5 to 6 ml., to one gram of phosphorus pentachloride, phosphorus trichloride or phosphorus. When the amount of the solvent is more than the above range, the yield of the crystalline oligomers lowers, and when the amount of the solvent is less than the above range, productivity lowers.

Ammonium chloride is employed in an amount of 0.8 to 10.0 moles, preferably 1.5 moles, per mole of phosphorus pentachloride, phosphorus trichloride or phosphorus. Although the particle size of ammonium chloride is not limited particularly, fine particles are desirable, since the reaction proceeds smoothly.

The reaction of ammonium chloride with phosphorus pentachloride is carried out at a temperature of 100° to 200° C. in an organic solvent inert to chlorine in the presence of a catalyst. Ammonium chloride, phosphorus pentachloride and a catalyst are dispersed in the organic solvent, and the reaction is carried out for 1.5 to 5 hours under reflux with stirring.

This reaction of ammonium chloride and phosphorus pentachloride may be carried out, while producing phosphorus pentachloride from phosphorus trichloride and chlorine. In this case, phosphorus trichloride is employed as the starting material instead of phosphorus pentachloride. Ammonium chloride, phosphorus trichloride and a catalyst are dispersed in an organic solvent inert to chlorine, and then the temperature is raised to 100° to 200° C. and chlorine gas is supplied into the dispersion to start the reaction. The reaction is carried out under reflux with stirring. During the reaction, an approximately equimolar amount of chlorine gas with phosphorus trichloride is supplied at a rate of 0.1 to 1.5 g./minute per mole of phosphorus trichloride to produce phosphorus pentachloride. The resulting phosphorus pentachloride reacts with ammonium chloride to produce the phosphonitrilic chloride oligomers. After the completion of the supply of chlorine gas, the reaction is further continued at a temperature of 100° to 200° C. for 0.5 to 2 hours under reflux with stirring to complete the reaction.

The phosphorus trichloride employed in the above method may be previously prepared in the reaction system from phosphorus such as white phosphorus or yellow phosphorus by supplying chlorine gas into the reaction system. Ammonium chloride, phosphorus and a catalyst are dispersed in an organic solvent inert to chlorine and after raising the temperature to 70° to 90° C., chlorine gas is supplied into the dispersion in an amount of about 1.5 moles per mole of phosphorus trichloride. The chlorine gas is usually supplied at a rate of 0.16 to 2.37 g./minute per mole of phosphorus. In this step, the reaction may be carried out in the absence of the catalyst. The temperature of the dispersion is then raised to 100° to 200° C., and the reaction is carried out to prepare the phosphonitrilic chloride oligomers in the same manner as in the case using phosphorus trichloride as the starting material.

According to the present invention, the phosphonitrilic chloride oligomers can be obtained in a yield of about 90% to about 97% by weight on the basis of phosphorus. In a known manner, the reaction product is separated into a component soluble in petroleum ether (cyclic phosphonitrilic chloride oligomers) and a component insoluble in petroleum ether (linear phosphonitrilic chloride oligomers). The crystalline phosphonitrilic chloride oligomers, i.e. tri- and tetra-phosphonitrilic chlorides are obtained by distilling away mostly petroleum ether from the petroleum ether-soluble component and then subjecting it to filtration with suction to remove the oily higher cyclic phosphonitrilic oligomers. Thus, the tri- and tetra-phosphonitrilic chlorides are obtained in high yields.

The present invention is more particularly described and explained by means of the following Examples, in which all % are by weight unless otherwise noted.

EXAMPLE 1

A one liter four necked flask equipped with a reflux condenser, a thermometer and a stirrer was charged with 500 ml. of monochlorobenzene, 129.1 g. (0.62 mole) of phosphorus pentachloride, 36.5 g. (0.68 mole) of ammonium chloride and 0.65 g. of zinc oxide to give a dispersion. The reaction was carried out at 130° C. for 5 hours under reflux with stirring.

The reaction mixture was filtered with suction to remove the unreacted ammonium chloride. Monochlorobenzene was then distilled away from the resulting filtrate at a temperature of 30° to 40° C. under a reduced pressure of 10 to 20 mmHg to give 66.8 g. of the reaction product. The yield of the reaction product was 93% on the basis of phosphorus pentachloride. The proportions of a petroleum ether-soluble component (cyclic compounds) and a petroleum ether-insoluble component (linear compounds) of the reaction product were 97% and 3%, respectively. Also, the ratio of the crystalline phosphonitrilic chloride compounds, i.e. tri- and tetra-phosphonitrilic chlorides to higher cyclic phosphonitrilic chloride compounds in the petroleum ether-soluble component was 88.7:11.3.

EXAMPLES 2 TO 6

The procedure of Example 1 was repeated except that a catalyst as shown in Table 1 was employed.

The results are shown in Table 1 together with the result of Example 1.

EXAMPLE 7

A one liter four necked flask equipped with a reflux condenser, a thermometer, a stirrer and a tube for supplying chlorine gas was charged with 500 ml. of mc chlorobenzene, 85.1 g. (0.62 mole) of phosphorus chloride, 36.5 g. (0.68 mole) of ammonium chloride 0.43 g. of zinc oxide to give a dispersion. The disper: was heated at 130° C., and chlorine gas was supp into the dispersion at a rate of 0.47 g./minute fol minutes under reflux. After the completion of the s ply, the reaction mixture was further refluxed at 130 for 1 hour to complete the reaction. Total reaction t was 2 hours and 36 minutes. From the thus obtai reaction mixture, the crystalline phosphonitrilic cl ride oligomers were obtained in the same manner a Example 1.

The result is shown in Table 1.

EXAMPLES 8 TO 13

The procedure of Example 7 was repeated exc that a catalyst as shown in Table 1 was employed.

The results are shown in Table 1.

EXAMPLE 14

A one liter four necked flask equipped with a ref condenser, a thermometer, a stirrer and a tube for s plying chlorine gas was charged with 500 ml. of te chloroethane, 19.4 g. (0.63 mole) of white phosphoi 36.5 g. (0.68 mole) of ammonium chloride and 0.63 g zinc oxide to give a dispersion. The dispersion \ heated at a temerature of 80° to 90° C., and chlorine was supplied into the dispersion at a rate of 0.473 g./ nute for 144 minutes to produce phosphorus trichlori The temperature of the dispersion was then raised 140° C., and chlorine gas was further supplied into dispersion at a rate of 0.47 g./minute for 90 minu under reflux. After the completion of the supply, reaction mixture was further refluxed at 140° C. fo hour to complete the reaction. Total reaction time \ 4 hours and 54 minutes. From the thus obtained react mixture, the crystalline phosphonitrilic chloride oli; mers were obtained in the same manner as in Exampl The result is shown in Table 1.

EXAMPLES 15 TO 19

The procedure of Example 14 was repeated exc that a catalyst as shown in Table 1 was employed.

The results are shown in Table 1.

COMPARATIVE EXAMPLES 1 TO 3

The procedures of Examples 1, 7 and 14 were peated except that no catalyst was employed, resp tively.

The results are shown in Table 1.

TABLE 1

| Example No. | Catalyst Kind | Amount g. | Yield of Reaction Product % | Composition of Reaction Product | | Composition of Cyclic Compounds | |
|---|---|---|---|---|---|---|---|
| | | | | Linear Compounds % | Cyclic Compounds % | Crystalline Compounds % | Higher Cycl Compound: % |
| Ex. 1 | Zinc oxide | 0.65 | 93.0 | 3.0 | 97.0 | 88.7 | 11.3 |
| Ex. 2 | Zinc sulfide | 0.5 | 92.5 | 2.8 | 97.2 | 88.8 | 11.2 |
| Ex. 3 | Zinc stearate | 1.5 | 91.0 | 6.4 | 93.6 | 92.2 | 7.8 |
| Ex. 4 | Acetylacetonatomagnesium | 1.5 | 91.5 | 7.1 | 92.9 | 89.3 | 10.7 |
| Ex. 5 | Magnesium hydroxide | 0.5 | 90.8 | 7.5 | 91.5 | 89.4 | 10.6 |
| Ex. 6 | Diethylzinc | 1.0 | 90.7 | 11.3 | 88.7 | 87.6 | 12.4 |
| Ex. 7 | Zinc oxide | 0.43 | 96.3 | 1.1 | 98.9 | 86.6 | 13.4 |
| Ex. 8 | Zinc sulfide | 0.5 | 95.8 | 1.0 | 99.0 | 85.5 | 14.5 |
| Ex. 9 | Zinc stearate | 1.5 | 94.3 | 5.3 | 94.7 | 91.3 | 8.7 |

TABLE 1-continued

| Example No. | Catalyst Kind | Catalyst Amount g. | Yield of Reaction Product % | Composition of Reaction Product | | Composition of Cyclic Compounds | |
|---|---|---|---|---|---|---|---|
| | | | | Linear Compounds % | Cyclic Compounds % | Crystalline Compounds % | Higher Cyclic Compounds % |
| 10 | Acetylacetonatomagnesium | 1.5 | 92.5 | 7.5 | 92.5 | 90.3 | 9.7 |
| 11 | Magnesium hydroxide | 0.5 | 92.3 | 6.8 | 93.2 | 89.5 | 10.5 |
| 12 | Diethylzinc | 1.0 | 89.3 | 12.1 | 87.9 | 90.8 | 9.2 |
| 13 | Zinc peroxide | 0.5 | 94.7 | 3.2 | 96.8 | 84.8 | 15.2 |
| 14 | Zinc oxide | 0.65 | 92.5 | 15.3 | 84.7 | 91.8 | 8.2 |
| 15 | Zinc sulfide | 0.5 | 93.1 | 16.4 | 85.6 | 87.9 | 12.1 |
| 16 | Zinc stearate | 1.5 | 92.4 | 19.3 | 80.7 | 90.1 | 9.9 |
| 17 | Acetylacetonatomagnesium | 1.5 | 90.3 | 21.4 | 78.6 | 92.0 | 8.0 |
| 18 | Magnesium hydroxide | 0.5 | 90.5 | 23.1 | 76.9 | 95.4 | 4.6 |
| 19 | Diethylzinc | 1.0 | 90.0 | 22.9 | 77.1 | 91.9 | 8.1 |
| Con. Ex. 1 | — | — | 88.3 | 25.4 | 74.6 | 53.3 | 46.7 |
| Con. Ex. 2 | — | — | 87.2 | 28.5 | 71.5 | 59.0 | 41.0 |
| Con. Ex. 3 | — | — | 85.9 | 26.8 | 73.2 | 56.1 | 43.9 |

What we claim is:

1. In a process for preparing crystalline phosphonitic chloride oligomers by reacting phosphorus pentachloride with ammonium chloride in an organic solvent inert to chlorine, the improvement which comprises carrying out the reaction in the presence of 0.01% to 5% by weight, based on the weight of phosphorus pentachloride, of at least one catalyst selected from the group consisting of metal oxides of Groups II-A, II-B, III-A, IV-A, IV-B and VIII of the Periodic Table; sulfides of metals of Groups II-A and II-B of the Periodic Table, fatty acid salts of metals of Groups II-A and II-B of the Periodic Table, acetylacetonatomagnesium, acetylacetonatozinc, organometallic compounds of metals of Groups II-A and II-B of the Periodic Table and peroxides of metals of Groups II-A and II-B of the Periodic Table; metal hydroxides of Groups III-A and VIII of the Periodic Table; and magnesium hydroxide.

2. The process of claim 1, wherein said phosphorus pentachloride is produced in situ in the organic solvent by reacting phosphorus with chlorine gas to produce phosphorus trichloride and thereafter reacting the phosphorus trichloride with chlorine gas.

3. The process of claim 2, wherein said phosphorus trichloride is produced in the presence of said catalyst.

4. The process of claim 1, wherein ammonium chloride and phosphorus pentachloride are added to the organic solvent and then reacted in the presence of said catalyst at a temperature of 100° to 200° C.

5. The process of claim 1, wherein said catalyst is at least one member selected from the group consisting of MgO, CaO, ZnO, $B_2O_3$, SnO, $TiO_2$, CoO, BaS, CaS, ZnS, $Ba(CH_3COO)_2$, $Mg(C_{18}H_{35}O_2)_2$, $Zn(C_{18}H_{35}O_2)_2$, $[Mg(C_5H_7O_2)_2]$, $[Zn(C_5H_7O_2)_2]$, $(C_2H_5)_2Zn$, $(C_2H_5)_2Mg$, $ZnO_2$, $CdO_2$, $MgO_2$, $Mg(OH)_2$, $Al(OH)_3$, $Co(OH)_2$.

6. The process of claim 1, wherein said phosphorus pentachloride is produced in situ in the organic solvent by reacting phosphorus trichloride with chlorine gas.

7. The process of claim 1, wherein said fatty acid salts are salts of saturated and unsaturated fatty acids having 2 to 18 carbon atoms.

* * * * *